Oct. 5, 1937.  D. B. WILLIAMS  2,094,691
PACKED JOINT AND METHOD OF LEAKPROOFING THE SAME
Original Filed May 31, 1933
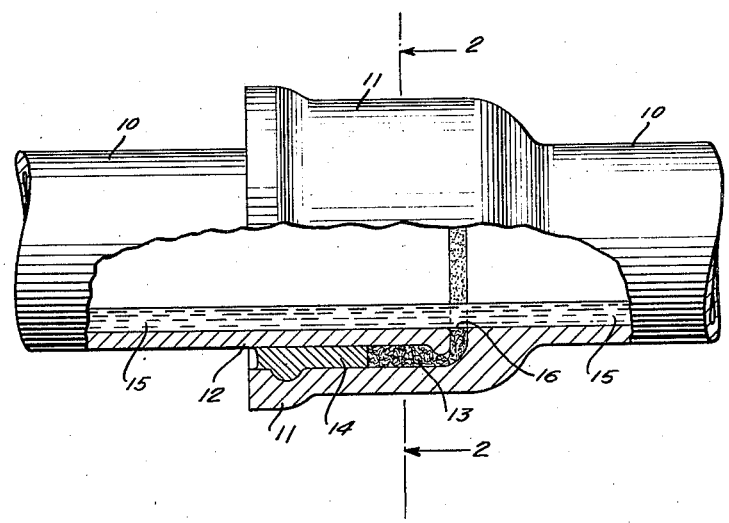
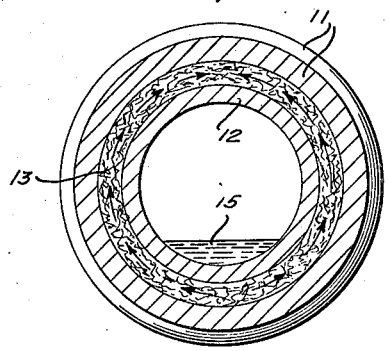
INVENTOR
DUNCAN B. WILLIAMS
BY
ATTORNEY Patented Oct. 5, 1937

2,094,691

UNITED STATES PATENT OFFICE 2,094,691

PACKED JOINT AND METHOD OF LEAK-PROOFING THE SAME

Duncan B. Williams, Glen Ridge, N. J., assignor, by mesne assignments, to The United Gas Improvement Company, Philadelphia, Pa., a corporation of Pennsylvania Application May 31, 1933, Serial No. 673,618
Renewed March 1, 1937

7 Claims. (Cl. 285—109)

This invention relates to packed joints and more specifically to packed joints of the bell and spigot type in gas conduits. The invention further relates to a new method of leak-proofing such joints.

It is one object of this invention to provide a new packed joint which is gas-tight over long periods of time and under substantial pressure.

Another object is to provide a simple, economical, and effective method of leak-proofing such joints.

A further object is to provide a simple and inexpensive method of leak-proofing defective packed joints in underground gas conduits, especially joints of the bell and spigot type, which can be applied without interrupting the service.

These and other objects will become apparent from the following specification taken together with the accompanying drawing in which:

Fig. 1 is a side elevation, partly in section, of a typical bell and spigot joint in a gas conduit, illustrating a preferred embodiment of my invention; and Fig. 2 is a cross-section on the line 2—2 of Fig. 1.

The invention is applicable to any two cooperating elements which have an absorbent packing between them for maintaining a gas-tight fit. For example, the cooperating elements may be the bell and spigot of a bell and spigot joint, or the two flanges of a flange joint, or a stuffing box and a shaft, or a piston and a cylinder, when these devices are used as parts of apparatus for processing or distributing gas. While in the following specification the invention is described in particularity with reference to packed bell and spigot joints in gas conduits, it is not to be construed as limited to this preferred embodiment.

Systems for the distribution of both natural and manufactured gases generally consist of conduits or mains usually laid underground. Until recently when welded joints have come into use, these conduits were constructed of sections of pipe, usually of cast iron, joined by means of bell and spigot joints packed with hemp, jute, or other absorbent material, and sealed with lead or cement in a well-known manner. The lead or cement seal is tight and effective in preventing gas leakage when first applied, but, after being subjected to temperature changes causing the conduit to expand and contract, or for other reasons, the seal becomes broken and is then no longer gas-tight. The effectiveness of the joint in preventing gas leakage then depends entirely on the packing, which is gas-tight only if it is moist or wet since it is then swollen resulting in the closing of the voids between the fibers.

Until recently when high pressure distribution has come into practice, these bell and spigot joints gave very little trouble, since the gas generally contained sufficient moisture to keep the packing saturated and therefore gas-tight. In fact, traps or "drips" were installed at low points in the mains to catch the condensed hydrocarbons, known collectively as "drip oil", and water vapor. However, when the gas is compressed to a high pressure (usually from 30 to 60 pounds per square inch gage) for long-distance distribution in welded mains before being expanded to a low pressure (usually about 6 inches gage of water) for local distribution, most of the water vapor and some of the oils are condensed out. There is then no longer sufficient drip oil and water vapor in the gas to keep the fibrous packing in the bell and spigot joints in the low-pressure mains moist. On the contrary, the gas is so dry that it rapidly draws out any remaining oil or moisture in the packing due to its affinity for this oil or moisture. The result is that the packing soon dries out and serious leaks occur.

A number of methods of correcting leaky joints have been proposed and used. The joints can be dug up individually and surrounded with a rubber clamp. This method is effective in stopping leakage, but very troublesome and expensive. Also, attempts have been made to remoisten the packing of leaky joints by spraying oil or steam into the gas (known respectively as oil fogging and steam fogging). The oil fogging method may be either hot or cold fogging. The oil commonly used for this purpose has been drip oil condensed out of the gas during compression, or other mineral oil. These methods are subject to the objection that the oil or steam so injected is effective for only a relatively short distance down the line from the point of application, the other joints remaining dry and leaking. Moreover, it is common experience that the fogging has to be continuous.

I have found that certain glycol liquids, ethylene glycol and diethylene glycol, are suitable for moistening the packing in packed joints, and joints treated with such liquids remain moist and effective in preventing gas leakage for considerable lengths of time.

These liquids possess properties in common with water in that they are absorbed by the packing and cause a comparable swelling of the same to return the packing to its original swollen condition.

The glycol liquids herein disclosed have other important advantages in that they readily wet the packing and in that they are substantially non-volatile. As a result the treatment is feasibly accomplished and is of a substantially permanent character.

It is found that the relative ineffectiveness of many liquids such, for instance, as spindle oil, for treating joint leakage in distribution systems is due to their relatively small swelling action upon the hemp, jute or other cellulosic packing material as compared to that caused by water.

I have determined experimentally that diethylene glycol is admirably suited as a moistening material for impregnating the packing in bell and spigot joints in gas conduits. It is a mildly viscous liquid boiling at about 244.5° C. at 760 mm. and having a vapor pressure of less than about 0.01 mm. mercury at 20° C. Moreover, it is substantially inert with respect to the various types of natural and artificial gases which are now used; these gases have substantially no affinity for this diglycol. Also it is a very hygroscopic liquid having a strong affinity for water vapor, and thus increases rather than decreases in mass on exposure to moisture; it draws out any moisture remaining in the gas after compression. Its wetting properties are a further advantage since it is necessary to contact only a small portion of the packing in a joint with diethylene glycol to completely and thoroughly wet the entire packing. The capillary action of the fibers rapidly causes the diglycol to spread throughout the packing.

The moistening liquid may be applied to the packing in a joint before, during, or after the installation of the joint in any one of a number of ways. The packing may be dipped in the liquid, or merely sprayed with the liquid before or during installation. If the joint is already in service in a conduit, sections of the conduit may be "blocked off" by means of inflated bags or other means, and these sections then completely filled with the liquid, after which the liquid can be drawn off and reused. Also, the liquid may be sprayed into the gas by the fogging process already mentioned so that the packing absorbs the liquid from the gas stream. In a preferred method of application, the liquid is introduced into the main at high points and allowed to run by gravity to low points where the excess can be drawn off. In these last two methods of application, service on the line is not interrupted, and the entire packing becomes saturated due to the capillary action of the fibrous packing as before described. The application of the liquid within a conduit has the added advantage that a thin film of the liquid remains on the wall of the pipe which settles dust or other solid matter from the gas and prevents the clogging of regulators, meters, and other gas appliances.

In the drawing, the joint in the gas main 10 comprises the bell 11 and the spigot 12 fitting within said bell and spaced therefrom. In the space between the bell and the spigot is an absorbent packing 13 and a seal 14 of lead or other suitable material for holding the packing in place. The moistening liquid 15 in my preferred method of application is run through the conduit by gravity. It contacts with the packing at 16, which space is left between the spigot and the shoulder of the bell to provide for expansion and contraction due to temperature changes. The packing absorbs the liquid at 16 and carries it up by capillary action as shown by the arrows in Fig. 2, helped by the walls of the bell and the spigot, until the entire packing is thoroughly saturated with the liquid. The liquid, of course, remains in the conduit only during the time that it is flowing from the point of introduction to the nearest drip.

As one illustration of the application of my invention a leaking bell and spigot joint in a 4-inch underground gas main was removed and treated with diethylene glycol. The joint leaked badly before treatment at a gage pressure of 6 inches of water. The treatment consisted in merely contacting the lower part of the packing with diethylene glycol. In two hours the diglycol had completely saturated the packing and all leaking stopped even at a gage pressure of 3 pounds per square inch. After three months under this pressure the joint was still absolutely gas-tight. The packing was still saturated with the diglycol with no apparent loss of diglycol, although the treatment had not been repeated. Experiments indicate that this method of leakproofing packed joints will be effective for a period of one to three years, or perhaps indefinitely.

Other tests have been conducted on leaking joints in gas mains without removing the joints. The diethylene glycol has been introduced at high points and allowed to flow through the main by gravity as before explained.

It will be understood that if a packing material has been treated or otherwise rendered wholly non-absorbent in character such, for instance, as by the application and drying of tar, impregnation will obviously require the absorbent condition to be restored prior to or during the course of the treatment set forth herein as described and claimed in copending application Serial Number 128,556, filed March 1, 1937, by John R. Skeen.

For the purpose of this specification and the claims the term "glycol" is intended to mean a restricted group of compounds consisting of ethylene glycol and diethylene glycol.

I claim:

1. A method for rejuvenating absorbent cellulosic packing such as untarred hemp and jute in a joint of a gas enclosure to reduce gas leakage at said joint, said packing having been previously swollen by absorption of water and then rendered pervious to gas by evaporation of water, comprising impregnating said packing with a liquid other than water but having a comparable swelling action on said packing to return said packing at least substantially to its original swollen condition, said impregnating liquid comprising a glycol.

2. A method for rejuvenating absorbent cellulosic packing such as absorbent hemp and jute in a joint of a gas enclosure to reduce gas leakage at said joint, said packing having previously absorbed moisture followed by drying, comprising impregnating said packing with a liquid comprising one of a group consisting of ethylene glycol and diethylene glycol to effect said rejuvenation.

3. A joint in a gas enclosure comprising spaced cooperating elements such as a bell and spigot, cellulosic fibrous packing between said cooperating elements positioned to form a seal, and a glycol absorbed by said packing.

4. A joint in a gas enclosure comprising a bell, a spigot positioned within and spaced from said bell to form an annular space, an annular ring of cellulosic fibrous packing in said annular space and continuously contacting said bell and spigot on its outer and inner peripheries respectively, and a glycol absorbed by said packing.

5. A method for reducing gas leakage at fibrous packed joints in gas enclosures comprising impregnating the fibrous packing of said joints with a liquid which causes swelling of said packing, said liquid having as a principal constituent at least one of a group consisting of ethylene glycol and diethylene glycol.

6. In a method for reducing gas leakage through fibrous packing such as jute and hemp in a joint of a gas conduit, the step of impregnating said fibrous packing while in place in said joint with a fluid comprising diethylene glycol to cause said packing to swell in said joint.

7. In a method for reducing gas leakage through fibrous packing such as jute and hemp in a joint of a gas conduit, the step of impregnating said fibrous packing while in place in said joint with a fluid comprising ethylene glycol to cause said packing to swell in said joint.

DUNCAN B. WILLIAMS.